US012111584B2

(12) United States Patent
Michishita et al.

(10) Patent No.: US 12,111,584 B2
(45) **Date of Patent: *Oct. 8, 2024**

(54) IMAGE FORMING APPARATUS WITH CHARGE ELIMINATING NEEDLE PROTECTION COVER THAT MAINTAINS CONSTANT INTERVAL BETWEEN THE NEEDLE AND A SHEET

(71) Applicant: KYOCERA Document Solutions Inc., Osaka (JP)

(72) Inventors: Yasuhiro Michishita, Osaka (JP); Keisuke Oba, Osaka (JP); Koji Uno, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/331,678

(22) Filed: Jun. 8, 2023

(65) Prior Publication Data

US 2023/0408948 A1 Dec. 21, 2023

(30) Foreign Application Priority Data

Jun. 16, 2022 (JP) ................................ 2022-097210

(51) Int. Cl.
*G03G 15/02* (2006.01)
*G03G 15/00* (2006.01)
(Continued)

(52) U.S. Cl.
CPC ....... *G03G 15/0233* (2013.01); *G03G 15/025* (2013.01); *G03G 15/04* (2013.01);
(Continued)

(58) Field of Classification Search
CPC ............. G03G 15/0233; G03G 15/025; G03G 15/1605; G03G 15/167; G03G 15/6535;
(Continued)

(56) References Cited

U.S. PATENT DOCUMENTS

2015/0110528 A1* 4/2015 Kuma ...................... H05F 3/00 361/220
2019/0196385 A1* 6/2019 Egi ........................ G03G 21/06
2023/0408947 A1* 12/2023 Michishita ........... G03G 15/045

FOREIGN PATENT DOCUMENTS

JP 2009-192898 A 8/2009

* cited by examiner

*Primary Examiner* — Joseph S Wong
(74) *Attorney, Agent, or Firm* — Stein IP, LLC

(57) ABSTRACT

An image forming apparatus includes a plurality of image forming portions, an intermediate transfer belt, a primary transfer member, a secondary transfer roller, a counter roller, and a charge eliminating device. The counter roller is pressed against the secondary transfer roller via an intermediate transfer belt to thereby form a secondary transfer nip portion. The charge eliminating device includes a charge eliminating needle that is disposed with an end part thereof pointing to a downstream side in a conveyance direction of the recording medium, and that is grounded, and a charge eliminating needle protection cover that has a guide surface that is opposed to the recording medium having passed through the secondary transfer nip portion, and that maintains a constant interval between the recording medium and the charge eliminating needle, and eliminates residual charge on the recording medium having passed through the secondary transfer nip portion.

10 Claims, 6 Drawing Sheets

(51) Int. Cl.
*G03G 15/04* (2006.01)
*G03G 15/16* (2006.01)
*G03G 21/06* (2006.01)

(52) U.S. Cl.
CPC ....... *G03G 15/1605* (2013.01); *G03G 15/167* (2013.01); *G03G 15/6535* (2013.01); *G03G 15/657* (2013.01); *G03G 21/06* (2013.01); *G03G 2221/0047* (2013.01)

(58) Field of Classification Search
CPC ...... G03G 15/657; G03G 15/04; G03G 21/06; G03G 2221/0047
See application file for complete search history.

IMAGE FORMING APPARATUS WITH CHARGE ELIMINATING NEEDLE PROTECTION COVER THAT MAINTAINS CONSTANT INTERVAL BETWEEN THE NEEDLE AND A SHEET

INCORPORATION BY REFERENCE

This application is based on and claims the benefit of priority from Japanese Patent Application No. 2022-097210 filed on Jun. 16, 2022, the contents of which are hereby incorporated by reference.

BACKGROUND

The present disclosure relates to an electro-photographic image forming apparatus, such as a copier, a printer, a facsimile machine, and a multifunction peripheral having functions of these apparatuses, and in particular relates to an intermediate transfer-type image forming apparatus in which a toner image is primarily transferred onto an intermediate transfer body and is then secondarily transferred onto a recording medium.

In an image forming apparatus employing an electro-photographic method, an electrostatic latent image formed on an image carrier such as a photosensitive body or the like is developed by a developing device to be visualized as a toner image. As such image forming apparatuses, intermediate transfer-type image forming apparatuses are widely used in which a toner image is primarily transferred from a photosensitive body onto an intermediate transfer body such as an intermediate transfer belt and is then secondarily transferred onto a recording medium such as a paper sheet.

In an intermediate transfer-type image forming apparatus, immediately following a secondary transfer nip portion at which a toner image on an intermediate transfer belt is secondarily transferred onto a paper sheet, there is disposed a separator to which is applied a direct current voltage/an alternate current voltage for separating the paper sheet or a charge eliminating device that is connected (earthed) to a ground.

SUMMARY

According to one aspect of the present disclosure, an image forming apparatus includes a plurality of image forming portions, an intermediate transfer belt, a primary transfer member, a secondary transfer roller, a counter roller, and a charge eliminating device. The image forming portions each include an image carrier having a photosensitive layer formed on a surface thereof, a charging device that charges the surface of the image carrier to a predetermined surface potential, an exposure device that irradiates the image carrier having been charged by the charging device with light and thereby forms an electrostatic latent image with attenuated charge, and a developing device that develops the electrostatic latent image having been formed on the surface of the image carrier into a toner image. The intermediate transfer belt is endless and disposed adjacent to the image forming portions, and the toner image having been formed on the surface of the image carrier is primarily transferred onto an outer circumferential surface of the intermediate transfer belt. The primary transfer member primarily transfers the toner image having been formed on the surface of the image carrier onto the intermediate transfer belt. The secondary transfer roller, at a secondary transfer nip portion formed between the secondary transfer roller and the intermediate transfer belt, secondarily transfers, onto a recording medium, the toner image having been primarily transferred onto the intermediate transfer belt. The counter roller is pressed against the secondary transfer roller via an intermediate transfer belt to thereby form the secondary transfer nip portion. The charge eliminating device eliminates residual charge on the recording medium having passed through the secondary transfer nip portion. The charge eliminating device includes a charge eliminating needle and a charge eliminating needle protection cover. The charge eliminating needle includes multiple charge eliminating needles that are arranged at constant intervals over an entire region in a width direction orthogonal to a conveyance direction of the recording medium, with end parts of the charge eliminating needles pointing to a downstream side in the conveyance direction of the recording medium, and the charge eliminating needle is connected to a ground. The charge eliminating needle protection cover has a guide surface that is opposed to the recording medium having passed through the secondary transfer nip portion, and the charge eliminating needle protection cover maintains a constant interval between the recording medium and the charge eliminating needle.

DETAILED DESCRIPTION

Figure 1:
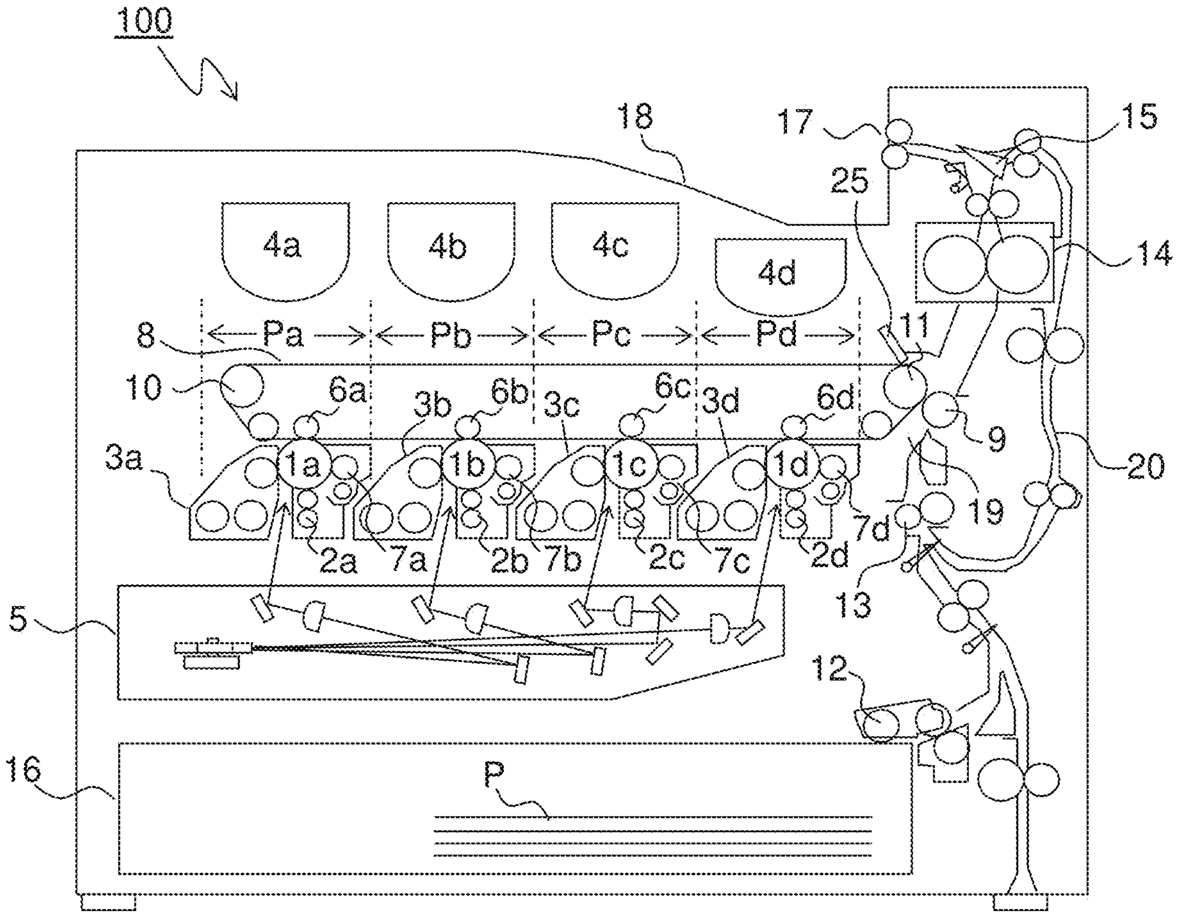
FIG. 1 is a schematic sectional view showing an overall configuration of an image forming apparatus according to a first embodiment of the present disclosure.

Hereinafter, embodiments of the present disclosure will be described with reference to the accompanying drawings. FIG. 1 is a sectional view showing an inner structure of an image forming apparatus 100 according to a first embodiment of the present disclosure. The image forming apparatus 100 (here, a color printer) includes, in a main body thereof, four image forming portions Pa, Pb, Pc, and Pd arranged in this order from an upstream side (a left side in FIG. 1) in a conveyance direction. These image forming portions Pa to Pd are provided corresponding to images of four different colors (yellow, cyan, magenta, and black), and the image forming portions Pa to Pd sequentially form yellow, cyan, magenta, and black images through charging, exposure, developing, and transfer steps.

In the image forming portions Pa to Pd, there are arranged photosensitive drums (image carriers) 1*a*, 1*b*, 1*c*, and 1*d* that carry visible images (toner images) of the four different colors. Further, an intermediate transfer belt (an intermediate transfer body) 8 that is driven by a belt driving motor (not shown) to rotate counterclockwise in FIG. 1 is disposed adjacent to the image forming portions Pa to Pd. The toner images formed on the photosensitive drums 1*a* to 1*d* are primarily transferred sequentially onto the intermediate transfer belt 8 which moves while in contact with the photosensitive drums 1*a* to 1*d*, so that the toner images are superimposed one on another on the intermediate transfer belt 8. Thereafter, the toner images having been primarily transferred onto the intermediate transfer belt 8 are secondarily transferred, by a secondary transfer roller 9, onto a transfer paper sheet P as one example of a recording medium. Further, the transfer paper sheet P, having the secondarily transferred toner images thereon, has the toner images fixed thereon at a fixing portion 13, and is then discharged from the main body of the image forming apparatus 100. While the photosensitive drums 1*a* to 1*d* rotating clockwise in FIG. 1, an image forming process is performed with respect to each of the photosensitive drums 1*a* to 1*d*.

The transfer paper sheet P onto which the toner images are to be secondarily transferred is stored in a sheet cassette 16 disposed in a lower part of the main body of the image forming apparatus 100, and is conveyed, via a sheet feeding roller 12 and a pair of registration rollers 13, along a sheet conveyance path 19, to a nip portion formed between the secondary transfer roller 9 and a driving roller 11 of the intermediate transfer belt 8. Used as the intermediate transfer belt 8 is a dielectric resin sheet, typically a (seamless) belt with no seam.

Further, on a downstream side of the secondary transfer roller 9, there is disposed a blade-shaped belt cleaner 25 for removing toner and the like left on a surface of the intermediate transfer belt 8.

Next, the image forming portions Pa to Pd will be described. Around and below the photosensitive drums 1*a* to 1*d*, which are arranged rotatably, there are provided charging devices 2*a*, 2*b*, 2*c*, and 2*d* that charge the photosensitive drums 1*a* to 1*d*, an exposure device 5 that exposes the photosensitive drums 1*a* to 1*d* to light conveying image information, developing devices 3*a*, 3*b*, 3*c*, and 3*d* that form toner images on the photosensitive drums 1*a* to 1*d*, and cleaning devices 7*a*, 7*b*, 7*c*, and 7*d* that remove developer (toner) and the like left on the photosensitive drums 1*a* to 1*d*.

Upon image data being inputted from a host device such as a personal computer, first, charging devices 2*a* to 2*d* uniformly charge surfaces of the photosensitive drums 1*a* to 1*d*. Then, the exposure device 5 irradiates the photosensitive drums 1*a* to 1*d* with light corresponding to the image data, so that electrostatic latent images are formed on the photosensitive drums 1*a* to 1*d* corresponding to the image data. The developing devices 3*a* to 3*d* are each filled with a predetermined amount of two-component developer including a yellow, cyan, magenta, or black toner. In a case where, due to toner image formation, which will be described later, a proportion of toner in the two-component developer filled in each of the developing devices 3*a* to 3*d* has fallen below a prescribed value, the developing devices 3*a* to 3*d* are each supplied with fresh toner from corresponding one of toner containers 4*a* to 4*d*. The toner included in the developer is supplied by each of the developing devices 3*a* to 3*d* onto a corresponding one of the photosensitive drums 1*a* to 1*d* to electrostatically adhere thereto, and thereby a toner image is formed corresponding to the electrostatic latent image having been formed by exposure to light from the exposure device 5.

Then, an electric field with a predetermined transfer voltage is applied across primary transfer rollers 6*a* to 6*d* and the photosensitive drums 1*a* to 1*d* by the primary transfer rollers 6*a* to 6*d*, and yellow, cyan, magenta, and black toner images formed on the photosensitive drums 1*a* to 1*d* are primarily transferred onto the intermediate transfer belt 8. These images are formed with a predetermined positional relationship among them determined in advance. Thereafter, in preparation for subsequent formation of new electrostatic latent images, residual toner and the like left on the surfaces of the photosensitive drums 1*a* to 1*d* after the primary transfer are removed by the cleaning devices 7*a* to 7*d*.

The intermediate transfer belt 8 is stretched around a driven roller 10, which is located on an upstream side, and a driving roller 11, which is located on a downstream side. When, along with rotation of the driving roller 11 driven by the belt driving motor (not shown), the intermediate transfer belt 8 starts to rotate counterclockwise, a transfer paper sheet P is conveyed, with predetermined timing, from the pair of registration rollers 13 to a secondary transfer nip portion N (see FIG. 2) between the driving roller 11 and the secondary transfer roller 9 disposed adjacent to the driving roller 11. Then, the toner images on the intermediate transfer belt 8 is secondarily transferred onto the transfer paper sheet P passing through the secondary transfer nip portion N.

The transfer paper sheet P onto which the toner images have been secondarily transferred is conveyed to a fixing portion 14. The fixing portion 14 includes a fixing belt 14*a* and a pressure roller 14*b* (for all of which, see FIG. 2). The fixing belt 14*a* is heated by a heating device (not shown) such as a heater, an induction heating portion, or the like. The pressure roller 14*b* is pressed against the fixing belt 14*a* to form a fixing nip portion, and gives rotation driving force to the fixing belt 14*a*.

The transfer paper sheet P conveyed to the fixing portion 14 is heated and pressurized by the fixing belt 14*a* and the pressure roller 14*b*, so that the toner images are fixed on a surface of the transfer paper sheet P, and thereby a predetermined full color image is formed. The transfer paper sheet P having the full-color image formed thereon has its conveyance direction switched by a branch portion 15 branching into a plurality of directions, so that the transfer paper sheet P is discharged as it is (or after being sent into a double-sided conveyance path 20 and subjected to double-sided printing) onto a discharge tray 18 by a pair of discharge rollers 17.

Figure 2:
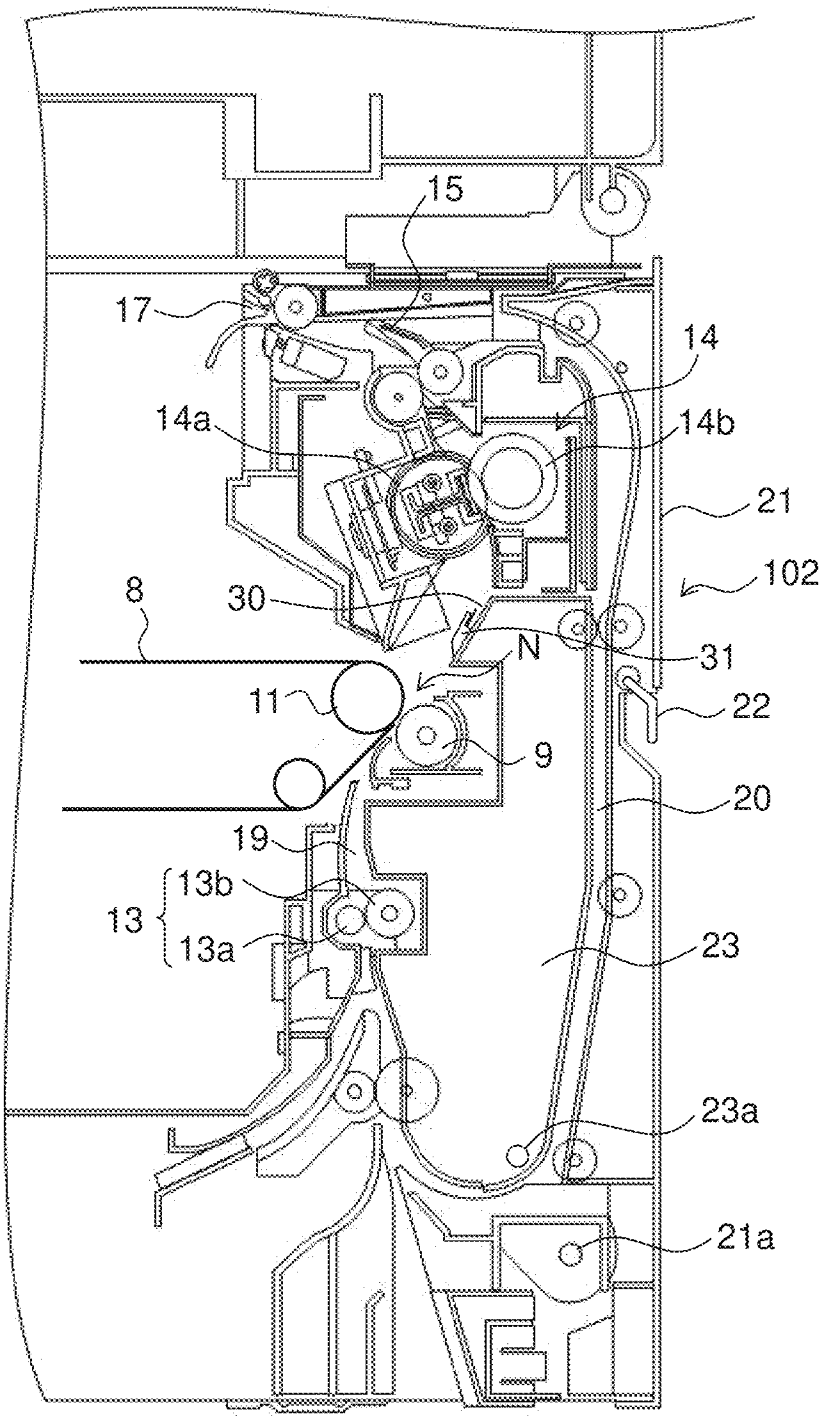
FIG. 2 is a partial sectional view of and around a sheet conveyance path and a double-sided conveyance path in the image forming apparatus according to the first embodiment.

FIG. 2 is a partial sectional view of and around the sheet conveyance path 19 and the double-sided conveyance path 20 in the image forming apparatus 100 according to the first embodiment. A side cover 21 constitutes a side face 102 of the image forming apparatus 100, and is rotatably supported by a cover support shaft 21*a* that is disposed in the lower part of the main body of the image forming apparatus 100.

At a side edge of the side cover 21, a hook 22 is provided. The hook 22 engages with an engagement pin (not shown) provided on a front frame and a rear frame of the main body of the image forming apparatus 100 to thereby hold the side cover 21 in a closed state. An inner surface of the side cover 21 constitutes one of conveyance surfaces of the double-sided conveyance path 20.

Inside the side cover 21, a conveyance unit 23 is disposed. The conveyance unit 23 is supported in the main body of the image forming apparatus 100 to be rotatable about a unit support shaft 23*a*, and constitutes part of conveyance surfaces of the double-sided conveyance path 20 and the sheet conveyance path 19. The double-sided conveyance path 20 extends in an up-down direction along the side face 102 of the image forming apparatus 100 between the inner surface of the side cover 21 and an outer side face of the conveyance unit 23, and is curved into a substantially C-shape to join the sheet conveyance path 19. On an inner side face of the conveyance unit 23, in order from an upstream side (a lower side in FIG. 2) in the conveyance direction of the transfer paper sheet P, there are disposed a roller 13*b*, which is one roller constituting the pair of registration rollers 13, and the secondary transfer roller 9.

By rotating the side cover 21 alone in an opening direction with respect to the image forming apparatus 100, the double-sided conveyance path 20 is widely exposed. Further, by rotating the side cover 21 in the opening direction along with the conveyance unit 23, the conveyance unit 23 is separated from an image forming apparatus 100 main-body side, so that the sheet conveyance path 19 is widely exposed. On the other hand, by rotating the side cover 21 in a closing direction along with the conveyance unit 23, the conveyance unit 23 is brought into contact with the image forming apparatus 100 main-body side, so that the secondary transfer roller 9 is pressed against the driving roller 11 via the intermediate transfer belt 8.

In the conveyance unit 23, a conveyance guide 30 is disposed. The conveyance guide 30, in the sheet conveyance path 19 on a downstream side of the secondary transfer roller 9, guides the transfer paper sheet P having passed through the secondary transfer nip portion N, and directs the transfer paper sheet P to the fixing portion 14. On the conveyance guide 30, a charge eliminating device 31 is disposed.

Figure 3:
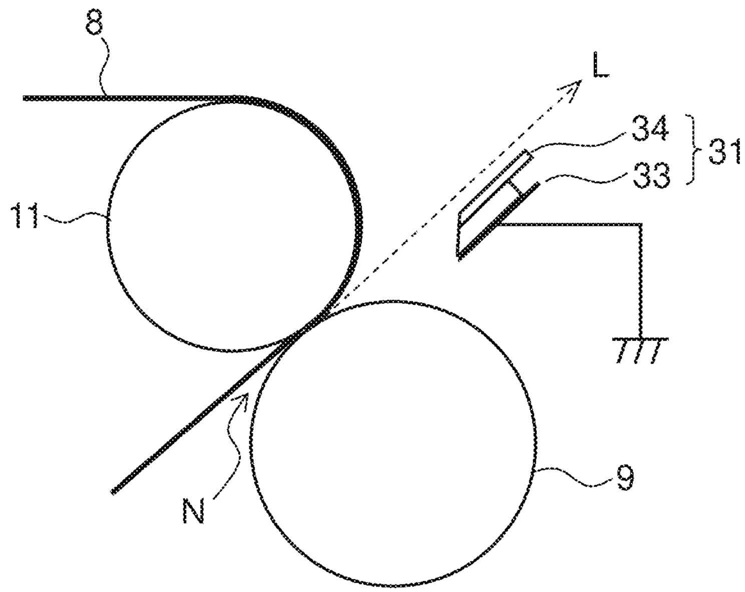
FIG. 3 is an enlarged view of and around a secondary transfer nip portion in FIG. 2.
Figure 4:
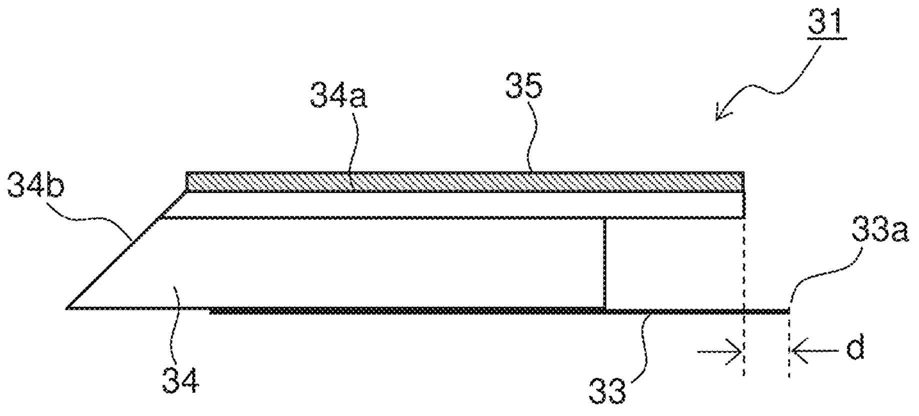
FIG. 4 is a side view of a charge eliminating device.

FIG. 3 is an enlarged view of and around the secondary transfer nip portion N shown in FIG. 2. FIG. 4 is a side view of the charge eliminating device 31. The charge eliminating device 31 includes a charge eliminating needle 33 and a charge eliminating needle protection cover 34. The charge eliminating needle 33 includes multiple charge eliminating needles 33 arranged at constant intervals over an entire region in a width direction (a direction perpendicular to the plane of the sheet on which FIG. 3 is drawn) that is orthogonal to the conveyance direction of the transfer paper sheet P. The charge eliminating needle 33 eliminates residual charge on the transfer paper sheet P passing through the secondary transfer nip portion N to thereby suppress scattering (electrostatic scattering) and electrostatic offset of toner images having been secondarily transferred onto the transfer paper sheet P. The charge eliminating needle 33 is connected to a main body frame (not shown) of the image forming apparatus 100 to be in a grounded (GND) state.

The charge eliminating needle protection cover 34 is made of resin and disposed between the transfer paper sheet P having passed through the secondary transfer nip portion N and the charge eliminating needle 33, and thereby maintains a constant interval between the transfer paper sheet P and the charge eliminating needle 33. A guide surface (a conveyance surface) 34*a* of the charge eliminating needle protection cover 34, the guide surface 34*a* being opposed to the transfer paper sheet P, constitutes part of the sheet conveyance path 19, and has a function as a conveyance guide for the transfer paper sheet P passing through the sheet conveyance path 19. Examples of a material of the charge eliminating needle protection cover 34 are an acrylonitrile-butadiene-styrene (ABS) resin and a polycarbonate (PC) resin.

At an end part of the charge eliminating needle protection cover 34 on a side of the secondary transfer nip portion N, an inclined surface 34*b* is formed. Assuming that a tangent line L of the secondary transfer roller 9 and the driving roller 11 is drawn to pass through the secondary transfer nip portion N, the inclined surface 34*b* is inclined in a direction approaching the tangent line L toward a downstream side in the conveyance direction (an upper-right direction in FIG. 3) of the transfer paper sheet P. A leading edge of the transfer paper sheet P having passed through the secondary transfer nip portion N is smoothly guided along the inclined surface 34*b* onto the guide surface 34*a*. Thereby, it is possible to suppress sheet jam caused by interference between the transfer paper sheet P and the charge eliminating device 31.

The charge eliminating needle 33 is disposed on a side of the charge eliminating needle protection cover 34 opposite to the guide surface 34*a*, with an end part (a needle tip) 33*a* thereof pointing to the downstream side in the conveyance direction of the transfer paper sheet P. With this configuration, the end part 33*a* of the charge eliminating needle 33 does not contact the transfer paper sheet P having passed through the secondary transfer nip portion N.

Separation performance of separating a transfer paper sheet P from the intermediate transfer belt 8 varies depending on a diameter of the driving roller 11 of the intermediate transfer belt 8, the driving roller 11 being opposed to the secondary transfer roller 9, and hardness of the secondary transfer roller 9. A relationship of the diameter of the driving roller 11 and the Asker-C hardness of the secondary transfer roller 9 to the separation performance is shown in Table 1. The separation performance was measured by using a laser displacement meter to measure a discharge angle at which a transfer paper sheet P is discharged from the secondary transfer nip portion N. In Table 1, "Poor" indicates a case where the discharge angle was inclined by 8° or more toward the intermediate transfer belt 8 from an ideal discharge angle (the tangent line-L direction), while "Good" indicates a case where the discharge angle was inclined by less than 8° toward the intermediate transfer belt 8, or the discharge angle was inclined toward the secondary transfer roller 9, from the ideal discharge angle.

TABLE 1

| | Driving Roller Diameter (mm) | | | | |
|---|---|---|---|---|---|
| Secondary Transfer Roller Hardness (°) | 30 | 24 | 18 | 16 | 14 |
| 27 | Poor | Poor | Poor | Poor | Good |
| 32 | Poor | Poor | Poor | Good | Good |
| 40 | Poor | Poor | Poor | Good | Good |

As shown in Table 1, to keep a good separation performance of separating a transfer paper sheet P from the intermediate transfer belt 8, the diameter of the driving roller 11 needs to be equal to or smaller than 16 mm, and the Asker-C hardness of the secondary transfer roller 9 needs to be equal to or higher than 30°.

Further, depending on the diameter of the driving roller 11 and the Asker-C hardness of the secondary transfer roller 9, occurrence of electrostatic scattering and electrostatic offset also varies. A relationship of the diameter of the driving roller 11 and the Asker-C hardness of the secondary transfer roller 9 to electrostatic scattering and electrostatic offset is shown in Table 2. Halftone images were printed and checked by visual observation for occurrence of electrostatic scattering and electrostatic offset. In Table 2, "Poor" indicates a case where electrostatic scattering or electrostatic offset or both occurred, and "Good" indicates a case where neither occurred.

TABLE 2

| | Driving Roller Diameter (mm) | | | | |
|---|---|---|---|---|---|
| Secondary Transfer Roller Hardness ( ° ) | 30 | 24 | 18 | 16 | 14 |
| 27 | Good | Good | Good | Good | Poor |
| 32 | Good | Good | Good | Good | Poor |
| 40 | Good | Good | Good | Poor | Poor |

As shown in Table 2, electrostatic scattering or electrostatic offset or both were observed in images printed when the diameter of the driving roller 11 was 16 mm or smaller and the Asker-C hardness of the secondary transfer roller 9 was 30° or higher.

Next, charging of the whole of each transfer paper sheet P was measured under conditions under which image failure had occurred and under conditions under which no image failure had occurred. As a result, it was found that the whole of each transfer paper sheet P had been charged to +3 kV or higher under the conditions under which image failure had occurred, while the whole of each transfer paper sheet P had been charged to +2 kV or lower, or had been negatively (−) charged, under the conditions under which no image failure had occurred. From this, it can be assumed that, due to positive (+) charge polarity of toner, if a transfer paper sheet P is strongly positively (+) charged on the whole, its force to hold the toner having the same polarity (+) is reduced, and this causes electrostatic scattering or electrostatic offset.

From the above results, it can be understood that in order to maintain good performance of separating a transfer paper sheet P from the intermediate transfer belt 8 while simultaneously suppressing occurrence of image failure, it is necessary to appropriately eliminate charge from the transfer paper sheet P. However, with a conventional configuration in which the charge eliminating needle 33 is disposed such that the end part 33*a* thereof is substantially perpendicular to the transfer paper sheet P, charge elimination is executed with such a high efficiency that charge may be eliminated unevenly to cause uneven image density.

To deal with this, in the present embodiment, as shown in FIG. 3, the charge eliminating needle 33 is disposed substantially parallel to the conveyance direction of the transfer paper sheet P such that the end part 33*a* thereof points to the downstream side in the conveyance direction, and a surface of the charge eliminating needle protection cover 34 on the side opposite to the charge eliminating needle 33 is formed as the guide surface 34*a* that serves as a conveyance guide for guiding the transfer paper sheet P. Thereby, it is possible to maintain a constant distance between the transfer paper sheet P conveyed along the guide surface 34*a* of the charge eliminating needle protection cover 34 and the charge eliminating needle 33, and thus to achieve uniform performance of charge elimination in eliminating charge from the transfer paper sheet P.

Strength of charge elimination effect (an amount of charge eliminated) by the charge eliminating device 31 can be adjusted by a projection amount d (see FIG. 4) of the charge eliminating needle 33 beyond the guide surface 34*a* of the charge eliminating needle protection cover 34. The larger the projection amount d is, the stronger the charge elimination effect becomes, and the smaller the projection amount d is, the weaker the charge elimination effect becomes.

As shown in FIG. 4, the guide surface 34*a* of the charge eliminating needle protection cover 34 has a sheet member 35 attached thereto. The guide surface 34*a* may be made of the ABS resin, the PC resin, or the like, which is a material of the charge eliminating needle protection cover 34, but, for higher slidability, it is preferable to attach the sheet member 35 made of a polytetrafluoroethylene (PTFE) sheet (No. 903 White, a product of Nitto Denko Corporation), an ultra-high molecular weight polyethylene (UPE) sheet (No. 440 White, a product of Nitto Denko Corporation), or the like, which has a coefficient of friction that is smaller than that of the charge eliminating needle protection cover 34. The coefficient of friction of the sheet member 35 is preferably equal to or smaller than 0.3.

Thereby, it is possible to reduce conveyance load for the transfer paper sheet P, and thus to suppress occurrence of problems, such as a jam of the transfer paper sheet P and a wrinkle formed in the transfer paper sheet P, which are attributable to increased conveyance load resulting from the transfer paper sheet P coming into surface contact with the guide surface 34*a* of the charge eliminating needle protection cover 34. Materials of the guide surface 34*a* of the charge eliminating needle protection cover 34 and their coefficients of friction are listed in Table 3. The coefficients of friction were measured by sliding a transfer paper sheet (C2 paper, a product of Xerox Corporation) under a load of 5 N and at a speed of 20 mm/s.

TABLE 3

| Material | Coefficient of Friction |
|---|---|
| PET | 0.2-0.25 |
| UPE | 0.18-0.23 |
| PTFE | 0.12-0.16 |
| PC | 0.25-0.30 |
| ABS | 0.14-0.18 |

Figure 5:
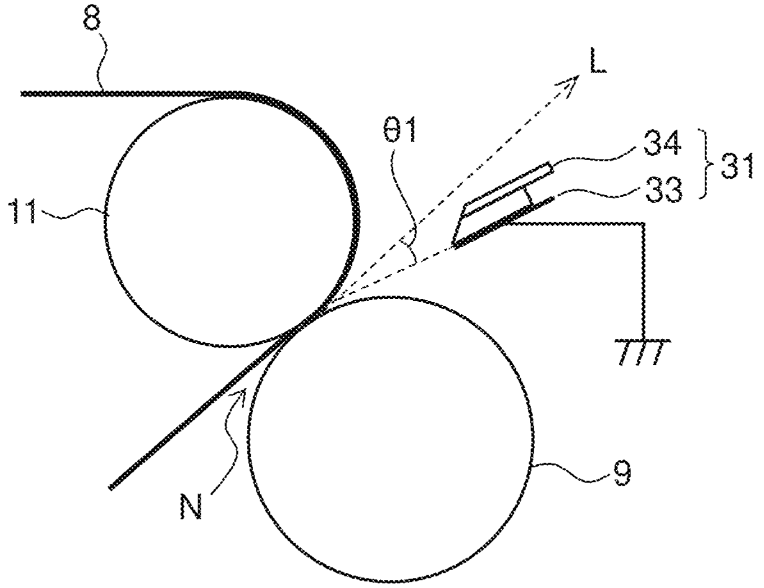
FIG. 5 is an enlarged view of and around the secondary transfer nip portion in the image forming apparatus according to the first embodiment, showing a modified example where an end part of a charge eliminating needle is inclined in a direction separating from a tangent line passing through the secondary transfer nip portion.
Figure 6:
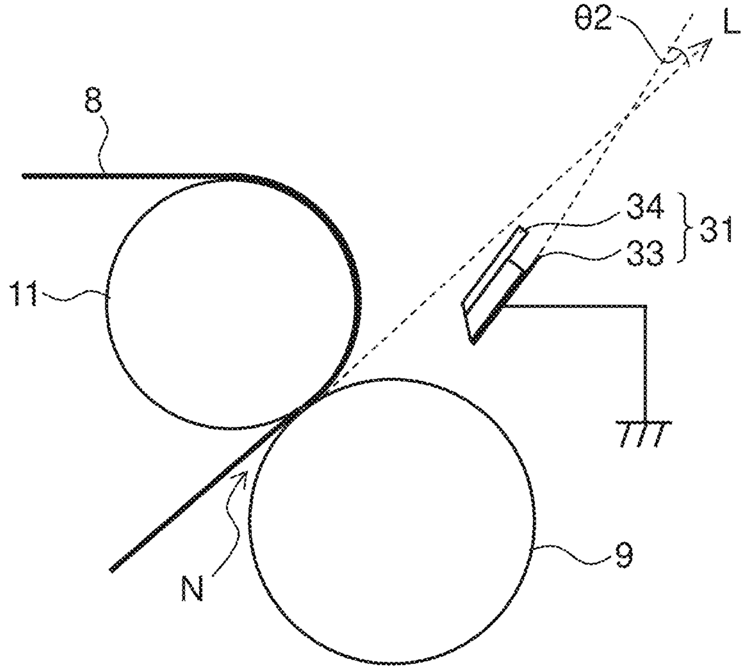
FIG. 6 is an enlarged view of and around the secondary transfer nip portion in the image forming apparatus according to the first embodiment, showing a modified example where the end part of the charge eliminating needle is inclined in a direction approaching the tangent line passing through the secondary transfer nip portion.

FIGS. 5 and 6 are diagrams showing a modified example in which the end part 33*a* of the charge eliminating needle 33 is inclined with respect to the tangent line L passing through the secondary transfer nip portion N. FIG. 5 shows a state where the end part 33*a* of the charge eliminating needle 33 is inclined in a direction separating from the tangent line L, while FIG. 6 shows a state where the end part 33*a* of the charge eliminating needle 33 is inclined in a direction approaching the tangent line L.

The charge eliminating needle 33 does not have to be disposed in perfect parallel with an ideal discharge angle (a direction of the tangent line L) of the transfer paper sheet P, and may be inclined by a predetermined angle, as in FIGS. 5 and 6. A relationship between the angle of the end part 33*a* of the charge eliminating needle 33 makes with respect to the ideal discharge angle of the transfer paper sheet P and occurrence of image failure is shown in Table 4. An inclination angle by which the end part 33*a* of the charge eliminating needle 33 is inclined is classified such that an inclination angle (angle θ1 in FIG. 5) in the direction in which the end part 33*a* separates from the tangent line L is a plus angle (+), and an inclination angle (angle θ2 in FIG. 6) in which the end part 33*a* approaches the tangent line L is a minus angle (−). Evaluation of image failure was performed by visual observation of halftone images printed under conditions where the diameter of the driving roller 11 was 16 mm and the Asker-C hardness of the secondary transfer roller 9 was 40°.

TABLE 4

| Angle of Charge Eliminating Needle (°) | | | | | | |
|---|---|---|---|---|---|---|
| −150 | −30 | −15 | 0 | 15 | 30 | 45 |
| Poor (*1) | Poor (*1) | Good | Good | Good | Good | Poor (*2) |

Figure 7:
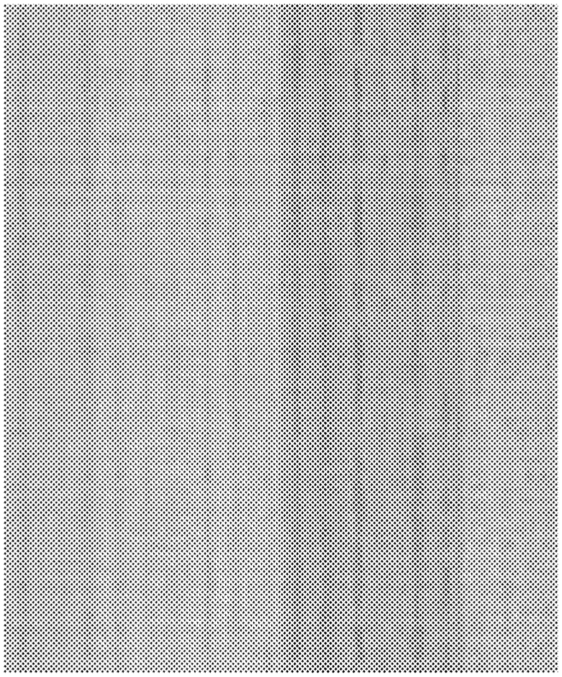
FIG. 7 is a photograph of a halftone image where image streaks have occurred.
Figure 8:
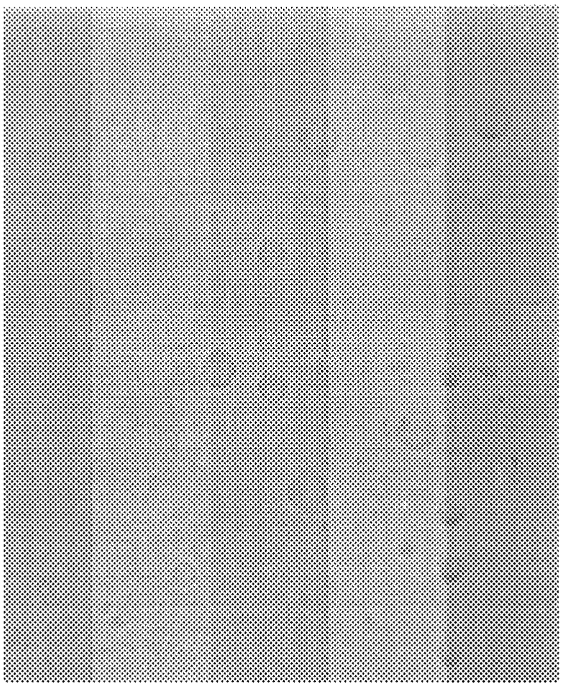
FIG. 8 is a photograph of a halftone image where electrostatic scattering has occurred.

(*1): image streaks (unevenness corresponding to the pitch of the charge eliminating needles)
(*2): electrostatic scattering As shown in Table 4, when the inclination angle of the end part 33*a* was from −15° to +30°, appropriate charge elimination was performed on the transfer paper sheets P, and no image failure occurred. In contrast, when the inclination angle was smaller than −15° (larger in the −direction), the charge elimination effect was excessive, and image streaks as shown in FIG. 7 occurred corresponding to the pitch (intervals) of the charge eliminating needles 33. On the other hand, when the inclination angle was larger than +30°, the charge elimination effect was insufficient, and electrostatic scattering occurred to cause a spotted image as shown in FIG. 8.

Figure 9:
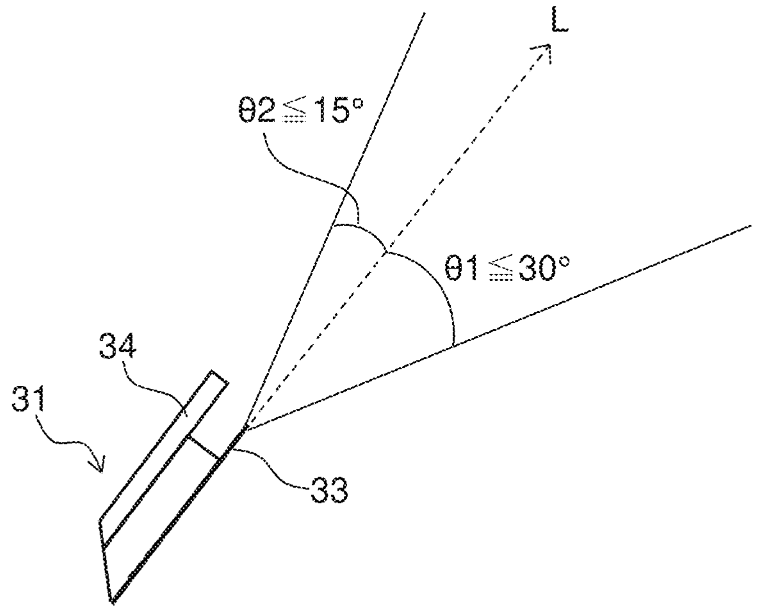
FIG. 9 is a diagram showing an appropriate range of an angle between the tangent line passing through the secondary transfer nip portion and the end part of the charge eliminating needle.

From results shown in Table 4, in a case where the charge eliminating needle 33 is disposed along a direction in which the end part 33*a* of the charge eliminating needle 33 separates from the tangent line L (see FIG. 5), it is preferable that the angle θ1 between the tangent line L and the end part 33*a* be equal to or smaller than 30°. Further, in a case where the charge eliminating needle 33 is disposed along a direction in which the end part 33*a* thereof approaches the tangent line L (see FIG. 6), it is preferable that the angle θ2 between the tangent line L and the end part 33*a* be equal to or smaller than 15°. Preferable ranges of the inclination angles θ1 and 02 between the tangent line L passing through the secondary transfer nip portion N and the end part 33*a* of the charge eliminating needle 33 are shown in FIG. 9.

Figure 10:
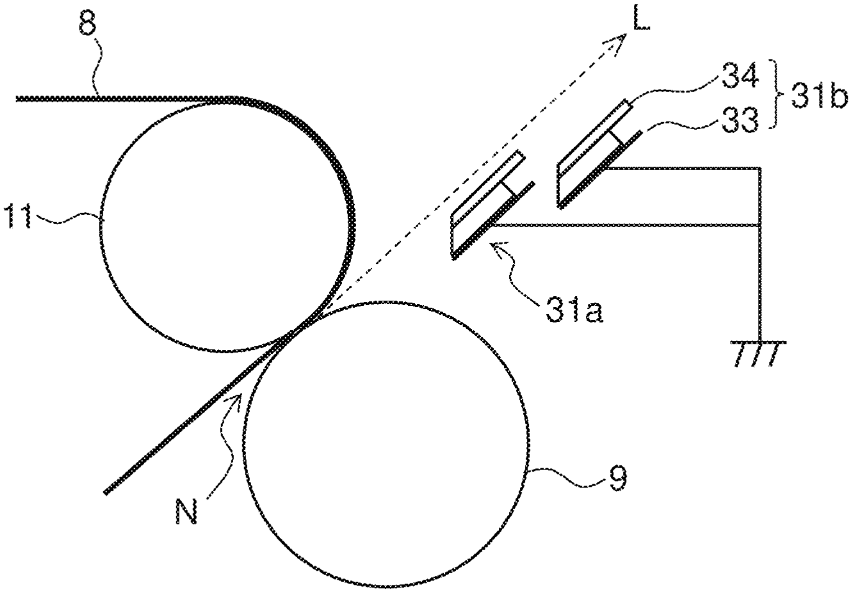
FIG. 10 is an enlarged view of and around a secondary transfer nip portion in an image forming apparatus according to a second embodiment of the present disclosure.

FIG. 10 is an enlarged view of and around a secondary transfer nip portion N in an image forming apparatus 100 according to a second embodiment of the present disclosure. In the present embodiment, in order from the upstream side in the conveyance direction of the transfer paper sheet P, a first charge eliminating device 31*a* and a second charge eliminating device 31*b* are disposed. The first charge eliminating device 31*a* and the second charge eliminating device 31*b* are both similar in configuration to the charge eliminating device 31 of the first embodiment shown in FIG. 4.

If the second charge eliminating device 31*b* is disposed close to a charge eliminating needle 33 of the first charge eliminating device 31*a*, there is no discharge space between the charge eliminating needle 33 of the first charge eliminating device 31*a* and the transfer paper sheet P, and this prevents efficient elimination of charge from the transfer paper sheet P. Thus, as shown in FIG. 10, the second charge eliminating device 31*b* is disposed at a position that is at a longer distance from the tangent line L as compared with the first charge eliminating device 31*a*, and thereby a discharge space is secured between the charge eliminating needle 33 of the first charge eliminating device 31*a* and the transfer paper sheet P.

In the present embodiment, with the two, first and second charge eliminating devices 31*a* and 31*b* disposed along the conveyance direction of the transfer paper sheet P, charge potential of the transfer paper sheet P is lowered from a high potential level to a middle potential level by the first charge eliminating device 31*a* disposed on the upstream side. And, by the second charge eliminating device 31*b* disposed on the downstream side, the charge potential of the transfer paper sheet P is further lowered from the middle potential level to a low potential level (close to zero). That is, by lowering residual charge on the transfer paper sheet P in a stepwise manner, it is possible, while suppressing occurrence of image streaks due to a sharp reduction of the charge potential of the transfer paper sheet P, to enhance the efficiency of eliminating charge from the transfer paper sheet P to thereby suppress occurrence of electrostatic scattering.

Further, by forming the first charge eliminating device 31*a* and the second charge eliminating device 31*b* with different projection amounts d of the charge eliminating needle 33, it is possible to adjust the charge elimination effect on the transfer paper sheet P to thereby further effectively suppress occurrence of image failure. A relationship of the projection amount d of the charge eliminating needle 33 in each of the first charge eliminating device 31*a* and the second charge eliminating device 31*b* to charge elimination effect and image failure is shown in Table 5.

In Table 5, the projection amount d of the charge eliminating needle 33 is, as shown in FIG. 4, a distance between the end part 33*a* of the charge eliminating needle 33 and an edge of the guide surface 34*a* of the charge eliminating needle protection cover 34. More specifically, the projection amount d in a case where the end part 33*a* of the charge eliminating needle 33 projects outward beyond the edge of the guide surface 34*a* is indicated with a plus sign (+), while it is indicated with a minus sign (−) in a case where the end part 33*a* of the charge eliminating needle 33 is disposed inward of the edge of the guide surface 34*a*.

TABLE 5

| Test Examples | Charge Eliminating Needle Projection Amount (mm): First Charge Eliminating Device | Charge Eliminating Needle Projection Amount (mm): Second Charge Eliminating Device | Transfer Paper Sheet Potential (kV) | Amount of Charge Eliminated | Evaluation of Image |
|---|---|---|---|---|---|
| 1 | −1 | Absent | 3.4 | 2.6 | Poor (*2) |
| 2 | 0 | Absent | 2.5 | 3.5 | Good |
| 3 | 1 | Absent | 1.2 | 4.8 | Poor (*1) |
| 4 | −1 | −1 | 2.7 | 3.3 | Good |
| 5 | −1 | 0 | 1.9 | 4.1 | Good |
| 6 | −1 | 1 | 0.8 | 5.2 | Good |
| 7 | 0 | −1 | 2.3 | 3.7 | Good |
| 8 | 0 | 0 | 1.8 | 4.2 | Good |
| 9 | 0 | 1 | 1.1 | 4.9 | Good |
| 10 | 1 | −1 | 1.1 | 4.9 | Poor (*1) |
| 11 | 1 | 0 | 0.8 | 5.2 | Poor (*1) |
| 12 | 1 | 1 | 0.8 | 5.2 | Poor (*1) |

(*1) image streaks (unevenness corresponding to the pitch of the charge eliminating needles)
(*2) electrostatic scattering As shown in Table 5, in the test examples 1 to 3, in which only the first charge eliminating device 31*a* was provided, when the projection amount of the charge eliminating needle 33 was 0 mm, an appropriate amount of charge was eliminated and no image failure occurred (Test Example 2). However, when the projection amount of the charge eliminating needle 33 was −1 mm, electrostatic scattering occurred due to an insufficient amount of charge eliminated (Test Example 1). Further, when the projection amount of the charge eliminating needle 33 was 1 mm, image streaks occurred due to an excessive amount of charge eliminated (Test Example 3).

In contrast, in test examples 4 to 12, in which the first charge eliminating device 31*a* and the second charge eliminating device 31*b* were both provided, when the projection amount d of the charge eliminating needle 33 of the first charge eliminating device 31*a* was −1 mm or 0 mm, no image failure occurred regardless of the projection amount d of the charge eliminating needle 33 of the second charge eliminating device 31*b* (Test Examples 4 to 9). However, when the projection amount d of the charge eliminating needle 33 of the first charge eliminating device 31*a* was 1 mm, regardless of the projection amount d of the charge eliminating needle 33 of the second charge eliminating device 31*a*, image streaks occurred due to an excessive amount of charge eliminated (Test Examples 10 to 12).

Here, in comparison between the test example 9 and the test example 10, despite the fact that the transfer paper sheets had the same potential of 1.1 kV after charge elimination and that the same amount of charge of 4.9 kV was eliminated in both of them, no image failure occurred in the test example 9 while image streaks due to excessive charge elimination occurred in the test example 10. It can be thought that, although total amounts of charge eliminated by the first charge eliminating device 31*a* and the second charge eliminating device 31*b* in both of the test examples 9 and 10 were the same, in the test example 10, the projection amount d of the charge eliminating needle 33 of the first charge eliminating device 31*a* was 1 mm, and this caused the first charge eliminating device 31*a* to eliminate a large amount of charge to invite the excessive charge elimination. This applies to the test examples 6, 11, and 12 as well.

From the above results, in the second embodiment, in which the first charge eliminating device 31*a* and the second charge eliminating device 31*b* are provided, by disposing the first charge eliminating device 31*a* such that the projection amount d of the charge eliminating needle 33 is equal to or less than zero, it is possible to give a sufficient margin to the projection amount d of the charge eliminating needle 33 of the second charge eliminating device 31*b*. Accordingly, regardless of accuracy of positions of the first charge eliminating device 31*a* and the second charge eliminating device 31*b*, dimensional tolerance of the charge eliminating needle 33 or the charge eliminating needle protection cover 34, etc., it is possible to stably perform stepwise elimination of charge from a transfer paper sheet P, and thus to effectively suppress occurrence of image failure.

It is to be understood that the present disclosure may be practiced in any other manner than specifically described above as embodiments, and various modifications are possible within the scope of the invention. For example, in the second embodiment described above, the first charge eliminating device 31*a* and the second charge eliminating device 31*b* are disposed along the conveyance direction of the transfer paper sheet P, but it is also possible to dispose three or more charge eliminating devices 31 along the conveyance direction of the transfer paper sheet P. Increasing the number of the charge eliminating devices 31 will have no effect on images, but will lead to a cost increase, and thus it is preferable to determine the number as needed.

Further, in the embodiments described above, the driving roller 11, which drives the intermediate transfer belt 8, is disposed as a counter roller to be opposed to the secondary transfer roller 9, and the driving roller 11 is pressed against the secondary transfer roller 9 via the intermediate transfer belt 8 to thereby form the secondary transfer nip portion N, but the counter roller to be opposed to the secondary transfer roller 9 may be a roller other than the driving roller 11.

In each of the above embodiments, a color printer as shown in FIG. 1 is dealt with as an example of the image forming apparatus 100, but application of the present disclosure is not limited to color printers, and the present disclosure is applicable to other types of image forming apparatuses employing an intermediate transfer method, such as color copiers, color multifunction peripherals, etc.

The present disclosure is usable in image forming apparatuses that employ an intermediate transfer method. By using the present disclosure, it is possible to provide an image forming apparatus capable of eliminating a suitable amount of charge from a recording medium after secondary transfer of a toner image onto it.

What is claimed is:

1. An image forming apparatus, comprising:

a plurality of image forming portions each including;

an image carrier having a photosensitive layer formed on a surface thereof;

a charging device that charges the surface of the image carrier to a predetermined surface potential;

an exposure device that irradiates the image carrier having been charged by the charging device with light and thereby forms an electrostatic latent image with attenuated charge; and a developing device that develops the electrostatic latent image having been formed on the surface of the image carrier into a toner image;

an intermediate transfer belt that is endless and disposed adjacent to the image forming portions, and onto an outer circumferential surface of which the toner image having been formed on the surface of the image carrier is primarily transferred;

a primary transfer member that primarily transfers the toner image having been formed on the surface of the image carrier onto the intermediate transfer belt;

a secondary transfer roller that, at a secondary transfer nip portion formed between the secondary transfer roller and the intermediate transfer belt, secondarily transfers, onto a recording medium, the toner image having been primarily transferred onto the intermediate transfer belt;

a counter roller that is pressed against the secondary transfer roller via the intermediate transfer belt to thereby form the secondary transfer nip portion; and a charge eliminating device that eliminates residual charge on the recording medium having passed through the secondary transfer nip portion, wherein the charge eliminating device includes:

a charge eliminating needle that includes multiple charge eliminating needles that are arranged at constant intervals over an entire region in a width direction orthogonal to a conveyance direction of the recording medium, with end parts of the charge eliminating needles pointing to a downstream side in the conveyance direction of the recording medium, and that is grounded; and a charge eliminating needle protection cover that has a guide surface that is opposed to the recording medium having passed through the secondary transfer nip portion and substantially parallel to a projecting direction of the end parts of the charge eliminating needles, and that maintains a constant interval between the recording medium and the charge eliminating needle.

2. The image forming apparatus according to claim 1, wherein assuming that a tangent line of the secondary transfer roller and the counter roller is drawn to pass through the secondary transfer nip portion, the charge eliminating device is disposed such that an inclination angle of an end part of the charge eliminating needle with respect to the tangent line is equal to or smaller than 30° in a case where the end part is inclined in a direction separating from the tangent line, and is equal to or smaller than 15° in a case where the end part is inclined in a direction approaching the tangent line.

3. The image forming apparatus according to claim 2, wherein the charge eliminating device is disposed such that the end part of the charge eliminating needle is substantially parallel to the tangent line.

4. The image forming apparatus according to claim 2, wherein at an end part of the charge eliminating needle protection cover on a side of the secondary transfer nip portion, an inclined surface is formed that is inclined in a direction approaching the tangent line toward a downstream side in the conveyance direction.

5. The image forming apparatus according to claim 1, wherein the charge eliminating device includes a plurality of charge eliminating devices disposed along the conveyance direction of the recording medium.

6. The image forming apparatus according to claim 5, wherein the charge eliminating device includes a first charge eliminating device disposed on an upstream side in the conveyance direction and a second charge eliminating device disposed on a downstream side in the conveyance direction, and in the first charge eliminating device, an amount of projection of the charge eliminating needle beyond the charge eliminating needle protection cover is equal to or less than zero.

7. The image forming apparatus according to claim 6, wherein assuming that a tangent line of the secondary transfer roller and the counter roller is drawn to pass through the secondary transfer nip portion, the second charge eliminating device is disposed at a position farther from the tangent line as compared with the first charge eliminating device.

8. The image forming apparatus according to claim 1, wherein the guide surface has attached thereto a sheet member that has a coefficient of friction that is smaller than a coefficient of friction of the charge eliminating needle protection cover.

9. The image forming apparatus according to claim 8, wherein the coefficient of friction of the sheet member is equal to or smaller than 0.3.

10. The image forming apparatus according to claim 1, wherein an outer diameter of the counter roller is equal to or smaller than 16 mm, and an Asker-C hardness of the secondary transfer roller is equal to or higher than 30°.

* * * * *